(12) United States Patent
Huang

(10) Patent No.: US 9,778,503 B2
(45) Date of Patent: *Oct. 3, 2017

(54) DISPLAY APPARATUS

(71) Applicant: InnoLux Corporation, Jhu-Nan, Miao-Li County (TW)

(72) Inventor: Shih-Chang Huang, Jhu-Nan (TW)

(73) Assignee: INNOLUX CORPORATION, Jhu-Nan, Miao-Li County (TW)

( * ) Notice: Subject to any disclaimer, the term of this patent is extended or adjusted under 35 U.S.C. 154(b) by 60 days.

This patent is subject to a terminal disclaimer.

(21) Appl. No.: 14/459,587

(22) Filed: Aug. 14, 2014

(65) Prior Publication Data

US 2015/0062509 A1    Mar. 5, 2015

(30) Foreign Application Priority Data

Aug. 27, 2013 (TW) .............................. 102130621 A

(51) Int. Cl.
*G02F 1/1335* (2006.01)

(52) U.S. Cl.
CPC .. *G02F 1/133514* (2013.01); *G02F 1/133617* (2013.01)

(58) Field of Classification Search
CPC ............... G02F 1/133514; G02F 2001/133519
See application file for complete search history.

(56) References Cited

U.S. PATENT DOCUMENTS

| 9,091,427 B2 * | 7/2015 | Huang ............... G02F 1/133514 |
| 2007/0076014 A1 * | 4/2007 | De Vaan .................. H04N 9/67 345/597 |

FOREIGN PATENT DOCUMENTS

CN         103676220 A      3/2014

* cited by examiner

*Primary Examiner* — Dung Nguyen
(74) *Attorney, Agent, or Firm* — Muncy, Geissler, Olds & Lowe, P.C.

(57) ABSTRACT

A display apparatus comprises a display panel. The display panel emits a green light having a green energy and a green point of the CIE 1931 xy chromaticity under the operation of the highest gray level of a green image, and emits a blue light having a blue energy and a blue point of the CIE 1931 xy chromaticity under the operation of the highest gray level of a blue image. The ratio of the green energy to the blue energy is between 0.7 and 1.5, and the coordinates of the green point in the CIE 1931 xy chromaticity diagram are bounded by the equation: $y=-48.85x^2+21.987x-1.7766$ and the equation: $y=-48.85x^2+27.849x-3.2717$, while y is between 0.68 and 0.72.

14 Claims, 6 Drawing Sheets

DISPLAY APPARATUS

CROSS REFERENCE TO RELATED APPLICATIONS

This Non-provisional application claims priority under 35 U.S.C. §119(a) on Patent Application No(s). 102130621 filed in Taiwan, Republic of China on Aug. 27, 2013, the entire contents of which are hereby incorporated by reference.

BACKGROUND OF THE INVENTION

1. Field of Invention

The invention relates to a display apparatus and, in particular, to a display apparatus having a higher color gamut and a better color display quality.

2. Related Art

With the progress of technologies, flat display apparatuses have been widely applied to various kinds of fields. Especially, liquid crystal display (LCD) apparatuses, having advantages such as compact structure, low power consumption, less weight and less radiation, gradually take the place of cathode ray tube (CRT) display devices, and are widely applied to various electronic products, such as mobile phones, portable multimedia devices, notebook computers, pad computers and other display devices.

An LCD apparatus mainly includes an LCD panel and a backlight module disposed opposite to the LCD panel. The LCD panel includes a thin-film transistor (TFT) substrate, a color filter (CF) substrate and a liquid crystal layer disposed between the two substrates. The CF substrate, the TFT substrate and the LC layer can form a plurality of pixels disposed in an array. The backlight module emits the light passing through the LCD panel, and the pixels of the LCD panel can display colors forming images accordingly.

In the design of a display apparatus, color taste is an important design factor and it can be shown by the chromaticity diagram. For example, the light emitted from a display panel can be specifically represented by a CIE 1931 xy chromaticity diagram, in which three primary colors (blue, green and red) have their respective color points, i.e. three vertices of the color triangle in the diagram. Currently, sRGB is commonly used as a chromaticity standard. Based on sRGB color space, in the CIE 1931 xy chromaticity diagram, the blue point is specified as (0.15, 0.06), the green point is specified as (0.3, 0.6), and the red point is specified as (0.64, 0.33), in coordinates (x, y). If the color points of three primary colors of a light deviate from the color points defined by the sRGB standard too much, the colors displayed by the display panel may be distorted and the display quality will be deteriorated. Moreover, high color gamut represents the wider color range that the display apparatus can display, becoming the goal pursued by all the firms.

Therefore, it is an important subject to provide a display apparatus having a higher color gamut and a better display quality so as to enhance the product competitiveness.

SUMMARY OF THE INVENTION

In view of the foregoing subject, an objective of the invention is to provide a display apparatus having a higher color gamut and a better display quality so as to enhance the product competitiveness.

To achieve the above objective, a display apparatus according to the invention includes a display panel. The display panel emits a green light e under the operation of the highest gray level (e.g. $255^{th}$ gray level for an 8-bit color level) of a green image, and the green light has a green energy and a green point of the CIE 1931 xy chromaticity. The display panel emits a blue light under the operation of the highest gray level of a blue image, and the blue light has a blue energy and a blue point of the CIE 1931 xy chromaticity. The ratio of the green energy to the blue energy is between 0.7 and 1.5. The coordinates of the green point in the CIE 1931 xy chromaticity diagram are bounded by the equation: $y=-48.85x^2+21.987x-1.7766$ and the equation: $y=-48.85x^2+27.849x-3.2717$, while y is between 0.68 and 0.72.

In one embodiment, the ratio of the green energy to the blue energy is further between 0.7 and 1.2.

In one embodiment, the ratio of the green energy to the blue energy is further between 0.75 and 1.1.

In one embodiment, the display panel emits a red light having a red energy and a red of the CIE 1931 xy chromaticity under the operation of the highest gray level of a red image, the ratio of the red energy to the blue energy is between 1.2 and 2.6, and the coordinates of the red point in the CIE 1931 xy chromaticity diagram are bounded by the equation: $y=-2.021x^2+2.1871x-0.2218$ and the equation: $y=-2.021x^2+2.1871x-0.2618$, while x is between 0.66 and 0.70.

In one embodiment, the ratio of the red energy to the blue energy is further between 1.2 and 1.7.

In one embodiment, the ratio of the red energy to the blue energy is further between 1.25 and 1.6.

In one embodiment, the coordinates of the blue point in the CIE 1931 xy chromaticity diagram are bounded by the equation: $y=-168.72x^2+50.312x-3.635$ and the equation: $y=-168.72x^2+63.81x-5.9174$, while y is between 0.04 and 0.08.

In one embodiment, the ratio of the green energy to the blue energy is further between 1.0 and 1.5.

In one embodiment, the ratio of the red energy to the blue energy is further between 2.0 and 2.6.

In one embodiment, the ratio of the red energy to the blue energy is further between 2.1 and 2.5.

In one embodiment, the coordinates of the green point in the CIE 1931 chromaticity xy diagram are further bounded by the equation: $y=-48.85x^2+23.452x-2.1174$ and the equation: $y=-48.85x^2+26.383x-2.8649$, while y is further between 0.69 and 0.71.

In one embodiment, the coordinates of the red point in the CIE 1931 chromaticity xy diagram are further bounded by the equation: $y=-2.021x^2+2.1871x-0.2318$ and the equation: $y=-2.021x^2+2.1871x-0.2518$, while x is further between 0.67 and 0.69.

In one embodiment, the coordinates of the blue point in the CIE 1931 chromaticity xy diagram are further bounded by the equation: $y=-168.72x^2+53.687x-4.155$ and the equation: $y=-168.72x^2+60.436x-5.2962$, while y is between 0.05 and 0.07.

In one embodiment, the green point is corresponding to the CIE 1976 u'v' chromaticity coordinates and the u' coordinate of the green point is between 0.05 and 0.1 while the v' coordinate thereof is greater than 0.55.

In one embodiment, the red point is corresponding to the CIE 1976 u'v' chromaticity coordinates and the u' coordinate of the red point is between 0.5 and 0.55 while the v' coordinate thereof is greater than 0.5.

In one embodiment, the blue point is corresponding to the CIE 1976 u'v' chromaticity coordinates and the u' coordinate of the blue point is between 0.15 and 0.2 while the v' coordinate thereof is between 0.1 and 0.2.

As mentioned above, in the display apparatus of the invention, the display panel emits a green light under the operation of the highest gray level (e.g. $255^{th}$ gray level for an 8-bit color level) of a green image and the green light has a green energy and a green point of the CIE 1931 xy chromaticity, and the display panel emits a blue light under the operation of the highest gray level of a blue image and the blue light has a blue energy and a blue point of the CIE 1931 xy chromaticity. The ratio of the green energy to the blue energy is between 0.7 and 1.5. The coordinates of the green point in the CIE 1931 xy chromaticity diagram are bounded by the equation: $y=-48.85x^2+21.987x-1.7766$ and the equation: $y=-48.85x^2+27.849x-3.2717$, while y is between 0.68 and 0.72. Thereby, the above-mentioned ranges of the color points approach the hue design of the sRGB standard, substantially coincide with the hue tones of the color points of the sRGB standard and extend towards the high-gamut direction, so that the display apparatus is provided with a higher color gamut and better display quality so as to enhance the product competitiveness.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
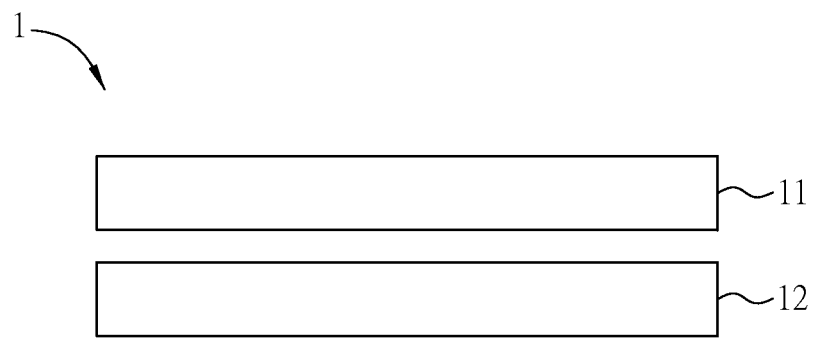
FIG. 1A is a schematic diagram of a display apparatus according to an embodiment of the invention.
Figure 1B:
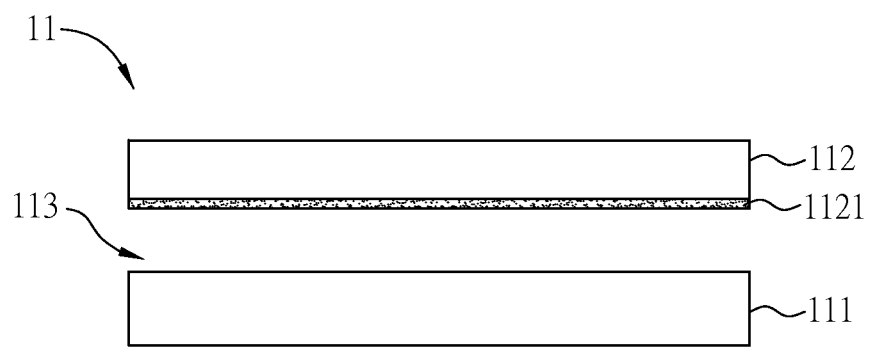
FIG. 1B is a schematic diagram of a display panel in FIG. 1A.

FIG. 1A is a schematic diagram of a display apparatus 1 according to an embodiment of the invention, and FIG. 1B is a schematic diagram of a display panel 11 in FIG. 1A.

The display apparatus 1 includes a display panel 11 and a backlight module 12 disposed opposite to the display panel 11. Herein, the display panel 11 is an LCD panel, and includes a first substrate 111, a second substrate 112, and a liquid crystal layer 113. The first substrate 111 is a thin-film transistor (TFT) substrate, and the second substrate 112 is a color filter substrate, for example. The liquid crystal layer 113 is disposed between the first substrate 111 and the second substrate 112. Each of the first and second substrates 111 and 112 can be a glass substrate, a transparent acrylic substrate or a flexible substrate, and also can be a touch substrate. As an embodiment, the second substrate 112 includes a color filter layer 1121, which includes a blue filter portion, a green filter portion and a red filter portion (not shown). When the light emitted by the backlight module 12 passes through the blue filter portion of the color filter layer 1121, the blue energy of the light of the display panel 11 is formed and can be shown by the blue spectrum of the light. When the light emitted by the backlight module 12 passes through the green filter portion, the green energy of the light of the display panel 11 is formed and can be shown by the green spectrum of the light. When the light emitted by the backlight module 12 passes through the red filter portion, the red energy of the light of the display panel 11 is formed and can be shown by the red spectrum of the light. In other embodiments, the color filter layer 1121 can be disposed on the first substrate 111.

Figure 2:
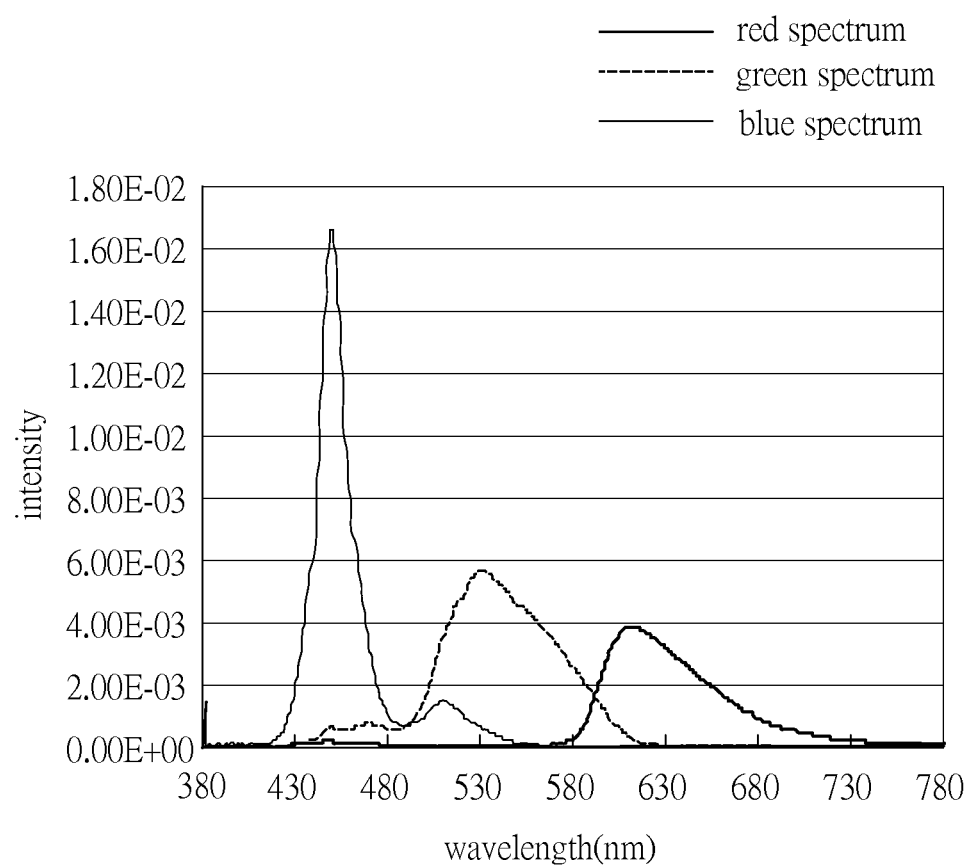
FIG. 2 is a schematic diagram of an intensity spectrum of the light passing through the display panel.

FIG. 2 is a schematic diagram of an intensity spectrum of the light passing through the display panel 11, wherein the unit of the intensity of the y coordinate is arbitrary.

As shown in FIG. 2, the intensity spectrum includes a green spectrum, a blue spectrum and a red spectrum. Herein, the green spectrum is obtained when the display panel 11 only displays the image of the highest gray level of green (e.g. $255^{th}$ gray level for an 8-bit color level), the red spectrum is obtained when the display panel 11 only displays the image of the highest gray level of red (e.g. $255^{th}$ gray level for an 8-bit color level), and the blue spectrum is obtained when the display panel 11 only displays the image of the highest gray level of blue (e.g. $255^{th}$ gray level for an 8-bit color level).

Herein, the green light has a green energy and a green point of the CIE 1931 xy chromaticity, and the green energy is corresponding to an integral area of the green spectrum (i.e. the area under the curve representing the green spectrum). The red light has a red energy and a red point of the CIE 1931 xy chromaticity, and the red energy is corresponding to an integral area of the red spectrum (i.e. the area under the curve representing the red spectrum). The blue light has a blue energy and a blue point of the CIE 1931 xy chromaticity, and the blue energy is corresponding to an integral area of the blue spectrum (i.e. the area under the curve representing the blue spectrum). Accordingly, the blue energy, green energy and red energy of the display panel 11 can be calculated as follows:

For the blue energy, $B=\int_{380}^{780} BLU(\lambda)*BCF(\lambda)*CELL(\lambda)d\lambda$.

For the green energy, $G=\int_{380}^{780} BLU(\lambda)*GCF(\lambda)*CELL(\lambda)d\lambda$.

For the red energy, $R=\int_{380}^{780} BLU(\lambda)*GCF(\lambda)*CELL(\lambda)d\lambda$.

$BLU(\lambda)$ denotes the energy distribution spectrum of the backlight module. $BCF(\lambda)$ denotes the transmission spectrum of the blue filter portion, $GCF(\lambda)$ denotes the transmission spectrum of the green filter portion, and $RCF(\lambda)$ denotes the transmission spectrum of the red filter portion. $CELL(\lambda)$ denotes the liquid crystal transmission spectrum of the display panel excluding the color filter (CF) layer, and $\lambda$ denotes wavelength. The values of 380 and 780 denote the wavelength range of the integral calculation with the unit of "nm", and the unit of the blue energy, green energy and red energy obtained by the integral is light watt. It can be seen from the calculations that the energy of each color can be adjusted to fit the required white point specification by changing $BLU(\lambda)$, $CF(\lambda)$ (including $BCF(\lambda)$, $GCF(\lambda)$, $RCF(\lambda)$) or $CELL(\lambda)$, so that the display apparatus 1 is enhanced in the product competitiveness by having a better display quality. Accordingly, with different white point setups, the color design of RGB shows variety, and that is to say the color points of RGB will be varied when the energy ratio is changed. Therefore, in this invention, the color points are controlled by scientifically adjusting the ratio of the RGB energy to fit the required white point specification.

Figure 3A:
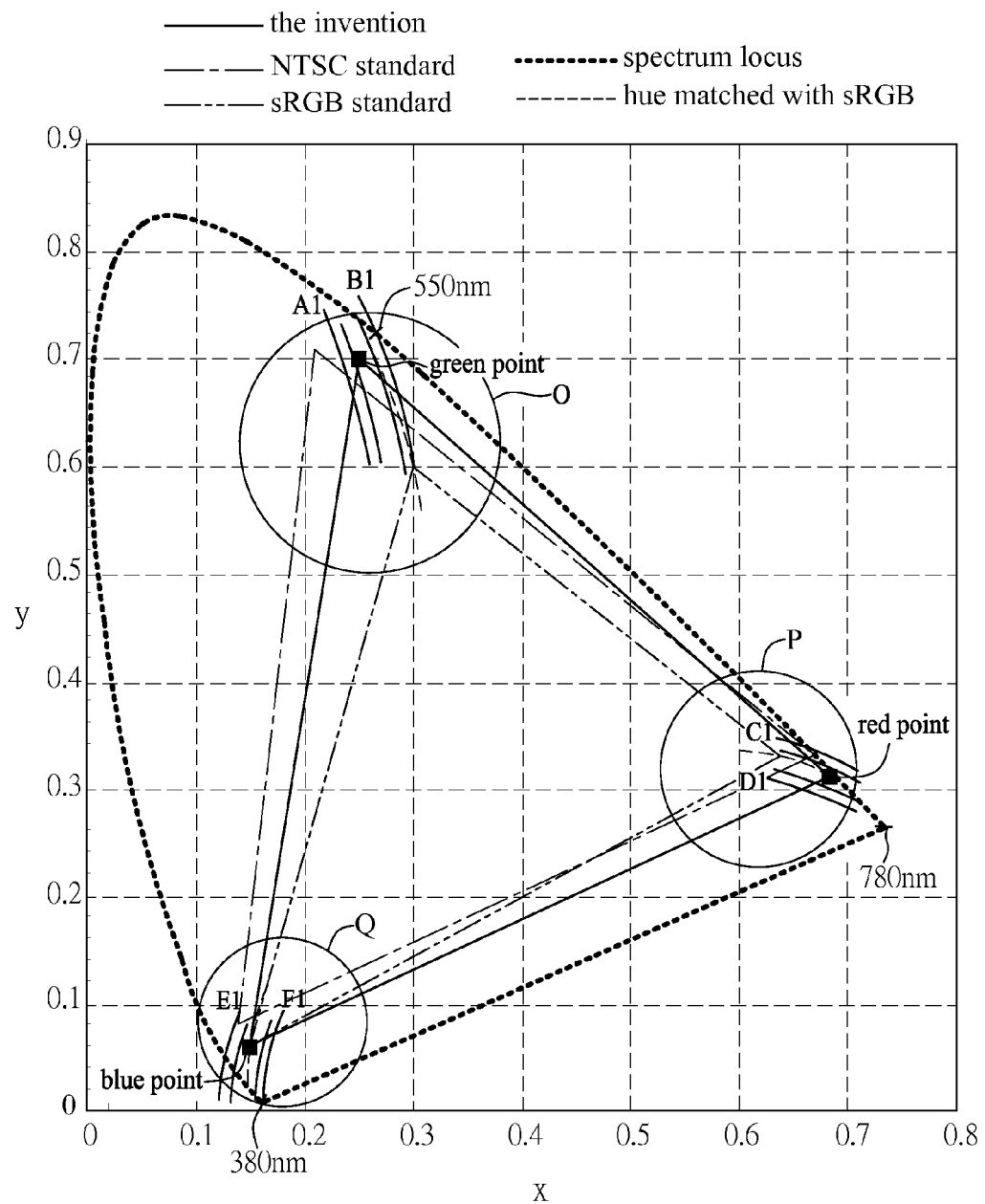
FIG. 3A is a schematic diagram of a CIE 1931 xy chromaticity diagram corresponding to the light emitted by the display panel according to an embodiment of the invention.

FIG. 3A is a schematic diagram of a CIE 1931 xy chromaticity diagram corresponding to the light emitted by the display panel 11 according to an embodiment of the invention. As shown in FIG. 3A, in the CIE 1931 xy chromaticity diagram, the spectrum locus represents a boundary of the real color, the color on or within the spectrum locus belongs to real color, and the color outside the spectrum locus belongs to imaginary color.

In order to make the hue design in the CIE 1931 xy chromaticity coordinates approach the sRGB standard so as to coincide with the hue of the green point of the sRGB standard substantially and extend towards the high-gamut direction (i.e. extending outwards along the substantial hue-matching way of the green point of the sRGB standard) for providing the display panel 11 with a higher gamut and better display quality, the display apparatus 1 is designed as follows: the ratio of the green energy to the blue energy is between 0.7 and 1.5, wherein the green energy is measured from the green light emitted by the display panel 11 displaying a green image under the operation of the highest gray level (e.g. $255^{th}$ gray level), and the blue energy is measured from the blue light emitted by the display panel 11 displaying a blue image under the operation of the highest gray level (e.g. $255^{th}$ gray level), so that the green point of the display panel 11 is within the real color range of the CIE 1931 xy chromaticity coordinates and bounded by the equation: $y=-48.85 x^2+21.987x-1.7766$ (equation A1) and the equation: $y=-48.85x^2+27.849x-3.2717$ (equation B1), while y is between 0.68 and 0.72. Therefore, not only the display panel 11 is kept approaching the hue tone of the green color of the sRGB standard, but also the range of the green point of this embodiment approaches the location of 550 nm of the spectrum locus more than the green point of the NTSC standard. Because the human eye has the highest sensitivity to the light of 550 nm, the transmittance of the display apparatus can be increased.

Moreover, in order to make the hue design in the CIE 1931 xy chromaticity coordinates approach the sRGB standard so as to coincide with the hue of the red point of the sRGB standard substantially and extend towards the high-gamut direction (i.e. extending outwards along the substantial hue-matching way of the red point of the sRGB standard) for providing the display panel 11 with a higher gamut and better display quality, the display apparatus 1 is designed as follows: the ratio of the red energy to the blue energy is between 1.2 and 2.6, wherein the red energy is measured from the red light emitted by the display panel 11 under the operation of the highest gray level (e.g. $255^{th}$ gray level) of a red image, and the blue energy is measured from the blue light emitted by the display panel 11 under the operation of the highest gray level (e.g. $255^{th}$ gray level) of a blue image, so that the red point of the display panel 11 is within the real color range of the CIE 1931 xy chromaticity coordinates and bounded by the equation: $y=-2.021x^2+2.1871x-0.2218$ (equation C1) and the equation: $y=-2.021x^2+2.1871x-0.2618$ (equation D0, while x is between 0.66 and 0.70. Therefore, not only the display panel 11 is kept approaching the hue tone of the red color of the sRGB standard, but also the color performance of the display apparatus is more vivid by increasing the color purity.

Moreover, in order to make the hue design in the CIE 1931 xy chromaticity coordinates fit the sRGB standard so as to approach the substantial blue point specified by the sRGB standard for providing the display panel 11 with a higher gamut and better display quality, the display apparatus 1 is designed as follows: the blue point, which is corresponding to the blue energy measured from the blue light emitted by the display panel 11 under the operation of the highest gray level (e.g. $255^{th}$ gray level) of a blue image, of the display panel 11 is within the real color range of the CIE 1931 xy chromaticity coordinates and bounded by the equation: $y=-168.72x^2+50.312x-3.635$ (equation E1) and the equation: $y=-168.72x^2+63.81x-5.9174$ (equation F1), while y is between 0.04 and 0.08.

Figure 3B:
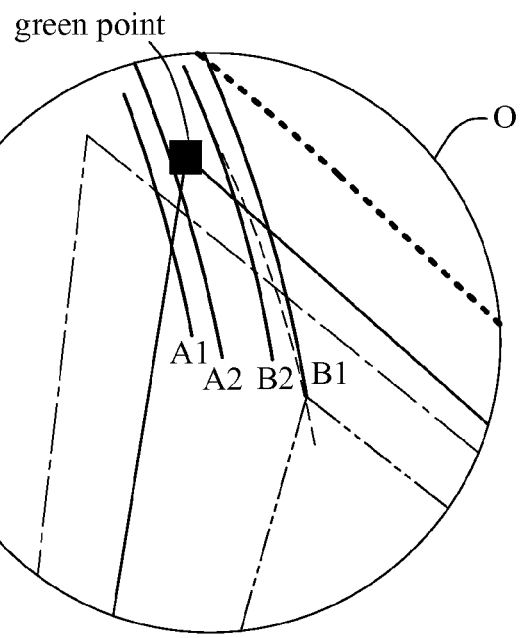
FIGS. 3B, 3C, and 3D are schematic enlarged diagrams of the regions O, P, Q in FIG. 3A, respectively.

Since the display apparatus is applied worldwide, the color point may be designed according to different races and sizes of human at different areas. Accordingly, if the white point of the display apparatus is required to be specified at a higher color temperature, in order to make the hue design in the CIE 1931 xy chromaticity coordinates approach the sRGB standard so as to coincide with the hue of the green point of the sRGB standard substantially and extend towards the high-gamut direction (i.e. extending outwards along the substantial hue-matching way of the green point of the sRGB standard) for providing the display panel 11 with a higher gamut and better display quality, the display apparatus 1 is designed as follows: the ratio of the green energy to the blue energy is between 0.7 and 1.2, wherein the green energy is measured from the green light emitted by the display panel 11 displaying a green image under the operation of the highest gray level (e.g. $255^{th}$ gray level), and the blue energy is measured from the blue light emitted by the display panel 11 displaying a blue image under the operation of the highest gray level (e.g. $255^{th}$ gray level), so that the green point of the display panel 11 is within the real color range of the CIE 1931 xy chromaticity coordinates and bounded by the equation: $y=-48.85 x^2+21.987x-1.7766$ (equation A1) and the equation: $y=-48.85x^2+27.849x-3.2717$ (equation B1), while y is between 0.68 and 0.72. Favorably, the ratio of the green energy to the blue energy is further between 0.75 and 1.1, and besides, as shown in the enlarged diagram of FIG. 3B, the green point is further bounded by the equation: $y=-48.85x^2+23.452x-2.1174$ (equation A2) and the equation: $y=-48.85x^2+26.383x-2.8649$ (equation B2), while y is further between 0.69 and 0.71. Therefore, not only the display panel 11 is kept approaching the hue tone of the green color of the sRGB standard, but also the range of the green point of this embodiment approaches the location of 550 nm of the spectrum locus more than the green point of the NTSC standard. Because the human eye has the highest sensitivity to the light of 550 nm (pure green light), the transmittance of the display apparatus can be increased.

Figure 3C:
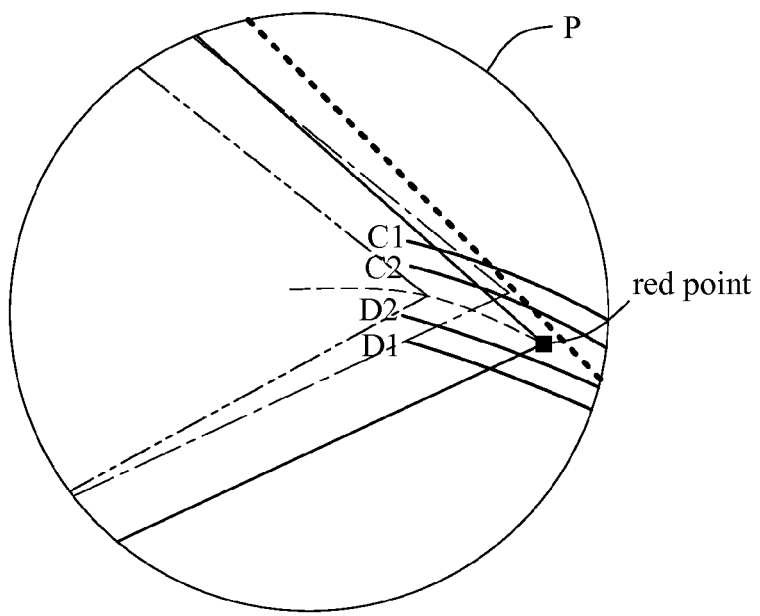

Moreover, in order to make the hue design in the CIE 1931 xy chromaticity coordinates approach the sRGB standard so as to coincide with the hue of the red point of the sRGB standard substantially and extend towards the high-gamut direction (i.e. extending outwards along the substantial hue-matching way of the red point of the sRGB standard) for providing the display panel 11 with a higher gamut and better display quality, the display apparatus 1 is designed as follows: the ratio of the red energy to the blue energy is between 1.2 and 1.7, wherein the red energy is measured from the red light emitted by the display panel 11 displaying a red image under the operation of the highest gray level (e.g. $255^{th}$ gray level), and the blue energy is measured from the blue light emitted by the display panel 11 displaying a blue image under the operation of the highest gray level (e.g. 255$^{th}$ gray level), so that the red point of the display panel 11 is within the real color range of the CIE 1931 xy chromaticity coordinates and bounded by the equation: $y=-2.021x^2+2.1871x-0.2218$ (equation C1) and the equation: $y=-2.021x^2+2.1871x-0.2618$ (equation D1), while x is between 0.66 and 0.70. Favorably, the ratio of the red energy to the blue energy is further between 1.25 and 1.6, and besides, as shown in the enlarged diagram of FIG. 3C, the red point is further bounded by the equation: $y=-2.021x^2+2.1871x-0.2318$ (equation C2) and the equation: $y=-2.021x^2+2.1871x-0.2518$ (equation D2), while x is further between 0.67 and 0.69. Therefore, the display panel 11 is kept approaching the hue tone of the red color of the sRGB standard. Besides, because the human eye can distinguish red color more keenly, the color performance of the display apparatus will be more vivid by increasing the color purity of red color, in comparison with the NTSC or sRGB standard.

Figure 3D:
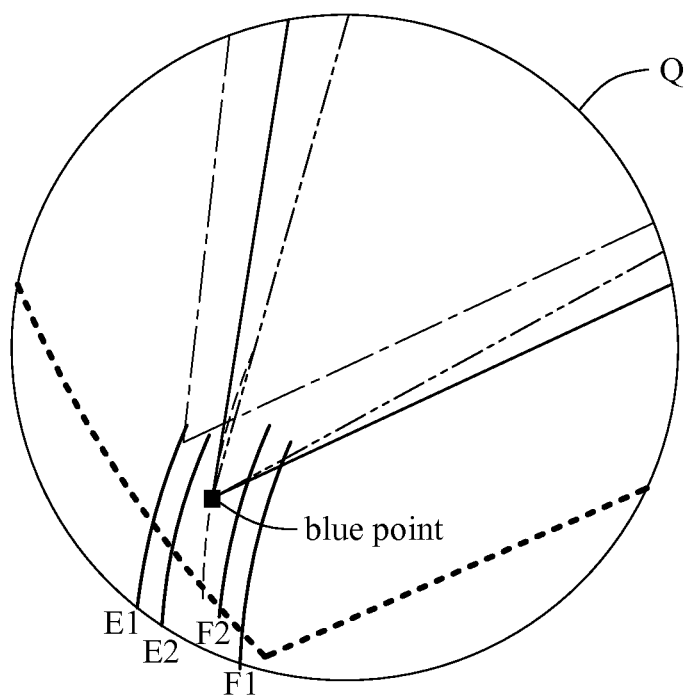

Moreover, in order to make the hue design in the CIE 1931 xy chromaticity coordinates approach the sRGB standard so as to approach the substantial hue-matching point with the blue point specified by the sRGB standard for providing the display panel 11 with a higher gamut and better display quality, the display apparatus 1 is designed as follows: the blue point, which is corresponding to the blue energy measured from the blue light emitted by the display panel 11 displaying a blue image under the operation of the highest gray level (e.g. 255$^{th}$ gray level), of the display panel 11 is within the real color range of the CIE 1931 xy chromaticity coordinates and bounded by the equation: $y=-168.72x^2+50.312x-3.635$ (equation E1) and the equation: $y=-168.72x^2+63.81x-5.9174$ (equation F1), while y is between 0.04 and 0.08. Favorably, as shown in the enlarged diagram of FIG. 3D, the blue point is further bounded by the equation: $y=-168.72x^2+53.687x-4.155$ (equation E2) and the equation: $y=-168.72x^2+60.436x-5.2962$ (equation F2), while y is further between 0.05 and 0.07.

In this situation, the x coordinate of the white point in the CIE 1931 xy chromaticity diagram corresponding to the light is within 0.28+0.010, and the y coordinate thereof is within 0.29+0.010. In other words, the coordinates of the white point in the CIE 1931 xy chromaticity diagram corresponding to the light is (0.28, 0.29), and the variation of each of the x and y coordinates is within +0.010, and besides, the corresponding RGB energy ratio is: $0.7 \leq G/B \leq 1.2$ and $1.2 \leq R/B \leq 1.7$.

Figure 4:
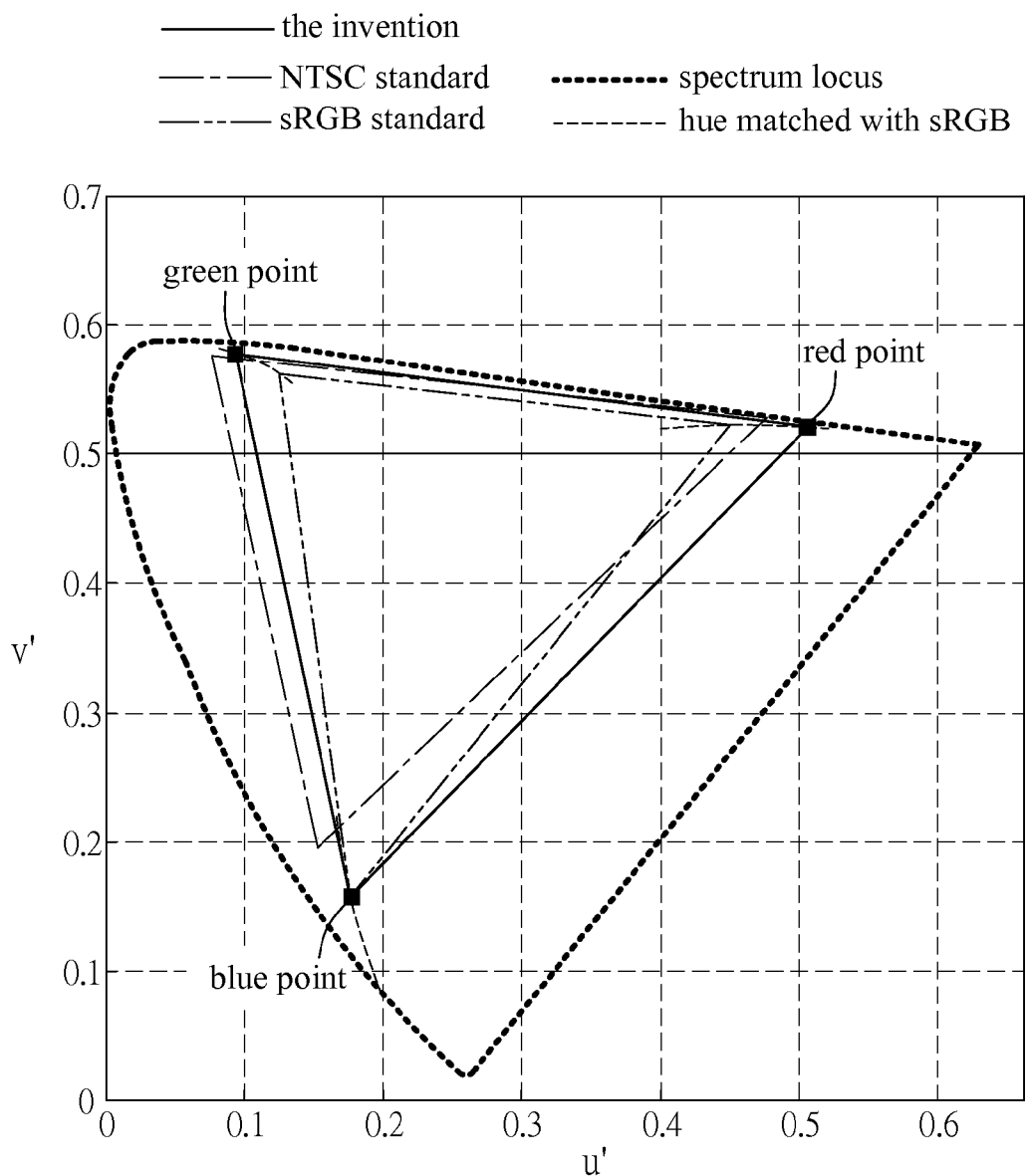
FIG. 4 is a schematic diagram of a CIE 1976 u'v' chromaticity coordinates corresponding to the light emitted by the display panel according to an embodiment of the invention.

FIG. 4 is a schematic diagram of a CIE 1976 u'v' chromaticity coordinates corresponding to the light emitted by the display panel 11 according to an embodiment of the invention.

As shown in FIG. 4, in order to make the color measured from the light emitted by the display panel 11 under the operation of the highest gray level (e.g. 255$^{th}$ gray level) have a better color uniformity, the color points complying with the above-mentioned energy ratio range (G/B, R/B) are converted into the CIE 1976 u'v' chromaticity coordinates from the CIE 1931 xy chromaticity coordinates. In order to make the hue design in the CIE 1976 u'v' chromaticity coordinates approach the sRGB standard so as to coincide with the hue of the red point, green point and blue point of the sRGB standard substantially and extend towards the high-gamut direction for providing the display panel 11 with a higher gamut and better display quality, the display apparatus 1 is designed as follows: the green light is corresponding to the CIE 1976 u'v' chromaticity coordinates and the u' coordinate of the green point is between 0.05 and 0.1 while the v' coordinate thereof is greater than 0.55, the red light is corresponding to the CIE 1976 u'v' chromaticity coordinates and the u' coordinate of the red point is between 0.5 and 0.55 while the v' coordinate thereof is greater than 0.5, the blue light is corresponding to the CIE 1976 u'v' chromaticity coordinates and the u' coordinate of the blue point is between 0.15 and 0.2 while the v' coordinate thereof is between 0.1 and 0.2. It can be seen from the CIE 1976 u'v' chromaticity coordinates that the hue range of the red color is obviously extended towards the high gamut region. Because the human eye can distinguish red color more keenly, the color performance of the display apparatus will be more vivid and the display quality can be enhanced by increasing the color purity of red color.

Since the color energy spectrum can be adjusted by designing the transmission spectrum of the filter portion CF($\lambda$), the energy can be varied by changing the material type of the filter portion (e.g. R254, R177, G7, G36, G58, Y150, Y138, Y139, B15:6) and its weight percentage. For example, the peak wavelength of the transmission spectrum of the blue filter portion is specified as between 440 nm and 460 nm, the peak wavelength of the transmission spectrum of the green filter portion is specified as between 500 nm and 550 nm, and the ratio of the green energy to the blue energy corresponding to the display panel 11 under the operation of the highest gray level is specified as between 0.7 and 1.2, and the ratio of the red energy to the blue energy is between 1.2 and 1.7, so that the green point in the CIE 1931 xy chromaticity diagram is bounded by the equation: $y=-48.85x^2+21.987x-1.7766$ (equation A1) and the equation: $y=-48.85x^2+27.849x-3.2717$ (equation B1) while y is between 0.68 and 0.72, the red point in the CIE 1931 xy chromaticity diagram is bounded by the equation: $y=-2.021x^2+2.1871x-0.2218$ (equation C1) and the equation: $y=-2.021x^2+2.1871x-0.2618$ (equation D1) while x is between 0.66 and 0.70, and the blue point in the CIE 1931 xy chromaticity diagram is bounded by the equation: $y=-168.72x^2+50.312x-3.635$ (equation E1) and the equation: $y=-168.72x^2+63.81x-5.9174$ (equation F1) while y is between 0.04 and 0.08. Moreover, in compliance with the above-mentioned energy ratio range, the green light is corresponding to the CIE 1976 u'v' chromaticity diagram and the u' coordinate of the green point is between 0.05 and 0.1 while the v' coordinate thereof is greater than 0.55, the red light is corresponding to the CIE 1976 u'v' chromaticity diagram and the u' coordinate of the red point is between 0.5 and 0.55 while the v' coordinate thereof is greater than 0.5, and the blue light is corresponding to the CIE 1976 u'v' chromaticity diagram and the u' coordinate of the blue point is between 0.15 and 0.2 while the v' coordinate thereof is between 0.1 and 0.2. Thereby, the light emitted by the display panel 11 can match with the hue of the colors of the sRGB standard substantially and is extended towards the high-gamut region, so that the display panel 11 is provided with a higher color gamut and better display quality so as to enhance the product competitiveness.

Moreover, the energy ratio can be adjusted by designing BLU($\lambda$) of the backlight module. For example, when blue LEDs cooperate with red and green phosphor powders to bring about a spectrum in the backlight module, by changing the material type or weight percentage of the phosphor powders or the current inputted to the backlight module, the peak wavelength of the blue light is approximately designed as between 440 nm and 460 nm, the peak wavelength of the transmission spectrum of the green phosphor powder is designed as between 500 nm and 550 nm, and the peak wavelength of the transmission spectrum of the red phosphor powder is designed as between 600 nm and 660 nm. As another example, when blue LEDs cooperate with yellow phosphor powder in the backlight module, by changing the material type or weight percentage of the phosphor powder or the current inputted to the backlight module, the peak wavelength of the blue light is approximately designed as between 440 nm and 460 nm, and the peak wavelength of the transmission spectrum of the yellow phosphor powder is designed as between 550 nm and 580 nm. Accordingly, the ratios of green energy to the blue energy and the red energy to the blue energy under the operation of the highest gray level can be adjusted. Additionally, the energy ratio also can be adjusted by designing the CELL($\lambda$) of the liquid crystal transmission spectrum. The above-mentioned methods for adjusting the energy ratio can be applied individually or together. The energy of the backlight module can be adjusted to fit the above-mentioned range by changing the material type and composition of the phosphor powder so that the display panel 11 can be provided with a higher color gamut and better display quality to enhance the product competitiveness. The phosphor powder includes sulfide-contained phosphor powder, nitride-contained phosphor powder or silicate-contained phosphor powder, for example.

Since the display apparatus is applied worldwide, the color point may be designed according to different races and sizes of human at different areas. Accordingly, if the white point of the display apparatus is required to be specified at a lower color temperature, in order to make the hue design in the CIE 1931 xy chromaticity diagram approach the sRGB standard so as to coincide with the hue of the green point of the sRGB standard substantially and extend towards the high-gamut direction (i.e. extending outwards along the substantial hue-matching way of the green point of the sRGB standard) for providing the display panel 11 with a higher gamut and better display quality, the display apparatus 1 is designed as follows: the ratio of the green energy to the blue energy is between 1.0 and 1.5, wherein the green energy is measured from the green light emitted by the display panel 11 displaying a green image under the operation of the highest gray level (e.g. $255^{th}$ gray level), and the blue energy is measured from the blue light emitted by the display panel 11 displaying a blue image under the operation of the highest gray level (e.g. $255^{th}$ gray level), so that the green light emitted by the display panel 11 is within the real color range of the CIE 1931 xy chromaticity diagram and the green point of the display panel 11 is bounded by the equation: $y=-48.85x^2+21.987x-1.7766$ (equation A1) and the equation: $y=-48.85x^2+27.849x-3.2717$ (equation B1) while y is between 0.68 and 0.72. Favorably, the ratio of the green energy to the blue energy is further between 1.1 and 1.4, and besides, as shown in the enlarged diagram of FIG. 3B, the green point is further bounded by the equation: $y=-48.85x^2+23.452x-2.1174$ (equation A2) and the equation: $y=-48.85x^2+26.383x-2.8649$ (equation B2) while y is further between 0.69 and 0.71. Therefore, not only the display panel 11 is kept approaching the hue tone of the green color of the sRGB standard, but also the range of the green point of this embodiment approaches the location of 550 nm of the spectrum locus more than the green point of the NTSC standard. Because the human eye has the highest sensitivity to the light of 550 nm (pure green light), the transmittance of the display apparatus can be increased.

Moreover, in order to make the hue design in the CIE 1931 xy chromaticity diagram approach the sRGB standard so as to coincide with the hue of the red point of the sRGB standard substantially and extend towards the high-gamut direction (i.e. extending outwards along the substantial hue-matching way of the red point of the sRGB standard) for providing the display panel 11 with a higher gamut and better display quality, the display apparatus 1 is designed as follows: the ratio of the red energy to the blue energy is between 2.0 and 2.6, wherein the red energy is measured from the red light emitted by the display panel 11 displaying a red image under the operation of the highest gray level (e.g. $255^{th}$ gray level), and the blue energy is measured from the blue light emitted by the display panel 11 displaying a blue image under the operation of the highest gray level (e.g. $255^{th}$ gray level), so that the light emitted by the display panel 11 is within the real color range of the CIE 1931 xy chromaticity diagram, and the red point is bounded by the equation: $y=-2.021x^2+2.1871x-0.2218$ (equation C1) and the equation: $y=-2.021x^2+2.1871x-0.2618$ (equation D1) while x is between 0.66 and 0.70. Favorably, the ratio of the red energy to the blue energy is further between 2.1 and 2.5, and besides, as shown in the enlarged diagram of FIG. 3C, the red point is further bounded by the equation: $y=-2.021x^2+2.1871x-0.2318$ (equation C2) and the equation: $y=-2.021x^2+2.1871x-0.2518$ (equation D2) while x is further between 0.67 and 0.69. Therefore, the display panel 11 is kept approaching the hue tone of the red color of the sRGB standard. Besides, because the human eye can distinguish red color more keenly, the color performance of the display apparatus will be more vivid by increasing the color purity of red color, in comparison with the NTSC or sRGB standard.

Moreover, in order to make the hue design in the CIE 1931 xy chromaticity diagram approach the sRGB standard so as to approach the substantial hue-matching point with the blue point specified by the sRGB standard for providing the display panel 11 with a higher gamut and better display quality, the display apparatus 1 is designed as follows: the blue point, which is corresponding to the blue energy measured from the blue light (within the real color range of the CIE 1931 xy chromaticity diagram) emitted by the display panel 11 displaying a blue image under the operation of the highest gray level (e.g. $255^{th}$ gray level), of the display panel 11 is bounded by the equation: $y=-168.72x^2+50.312x-3.635$ (equation E1) and the equation: $y=-168.72x^2+63.81x-5.9174$ (equation F1) while y is between 0.04 and 0.08. Favorably, as shown in the enlarged diagram of FIG. 3D, the blue point is further bounded by the equation: $y=-168.72x^2+53.687x-4.155$ (equation E2) and the equation: $y=-168.72x^2+60.436x-5.2962$ (equation F2) while y is further between 0.05 and 0.07.

In this situation, the x coordinate of the white point in the CIE 1931 xy chromaticity diagram corresponding to the light is within 0.313±0.010, and the y coordinate thereof is within 0.329±0.010. In other words, the coordinates of the white point in the CIE 1931 xy chromaticity diagram corresponding to the light is (0.313, 0.329), and the variation of each of the x and y coordinates is within ±0.010, and besides, the corresponding RGB energy ratio is: $1.0 \leq G/B \leq 1.5$ and $2.0 \leq R/B \leq 2.6$.

As shown in FIG. 4, in order to make the color measured from the light emitted by the display panel 11 under the operation of the highest gray level (e.g. $255^{th}$ gray level) have a better color uniformity, the color points complying with the above-mentioned energy ratio range (G/B, R/B) are converted into the CIE 1976 u'v' chromaticity diagram from the CIE 1931 xy chromaticity diagram. In order to make the hue design in the CIE 1976 u'v' chromaticity diagram approach the sRGB standard so as to coincide with the hue of the red point, green point and blue point of the sRGB standard substantially and extend towards the high-gamut direction for providing the display panel 11 with a higher gamut and better display quality, the display apparatus 1 is designed as follows: the green point is corresponding to the CIE 1976 u'v' chromaticity diagram and the u' coordinate of the green point is between 0.05 and 0.1 while the v' coordinate thereof is greater than 0.55, the red point is corresponding to the CIE 1976 u'v' chromaticity diagram and the u' coordinate of the red point is between 0.5 and 0.55 while the v' coordinate thereof is greater than 0.5, the blue point is corresponding to the CIE 1976 u'v' chromaticity diagram and the u' coordinate of the blue point is between 0.15 and 0.2 while the v' coordinate thereof is between 0.1 and 0.2. It can be seen from the CIE 1976 u'v' chromaticity diagram that the hue range of the red color is obviously extended towards the high gamut region. Because the human eye can distinguish red color more keenly, the color performance of the display apparatus will be more vivid and the display quality can be enhanced by increasing the color purity of red color.

Since the energy can be adjusted by designing the transmission spectrum of the filter portion $CF(\lambda)$, the energy can be varied by changing the material type of the filter portion (e.g. R254, R177, G7, G36, G58, Y150, Y138, Y139, B15:6) and its weight percentage. For example, the peak wavelength of the transmission spectrum of the blue filter portion is specified as between 440 nm and 460 nm, the peak wavelength of the transmission spectrum of the green filter portion is specified as between 500 nm and 550 nm, and the ratio of the green energy to the blue energy corresponding to the display panel 11 under the operation of the highest gray level is specified as between 1.0 and 1.5, and the ratio of the red energy to the blue energy is between 2.0 and 2.6, so that the green point in the CIE 1931 xy chromaticity diagram is bounded by the equation: $y=-48.85x^2+21.987x-1.7766$ (equation A1) and the equation: $y=-48.85x^2+27.849x-3.2717$ (equation B1) while y is between 0.68 and 0.72, the red point in the CIE 1931 xy chromaticity diagram is bounded by the equation: $y=-2.021x^2+2.1871x-0.2218$ (equation C1) and the equation: $y=-2.021x^2+2.1871x-0.2618$ (equation D1) while x is between 0.66 and 0.70, and the blue point in the CIE 1931 xy chromaticity diagram is bounded by the equation: $y=-168.72x^2+50.312x-3.635$ (equation E1) and the equation: $y=-168.72x^2+63.81x-5.9174$ (equation F1) while y is between 0.04 and 0.08. Moreover, in compliance with the above-mentioned energy ratio, the green light is corresponding to the CIE 1976 u'v' chromaticity diagram and the u' coordinate of the green point is between 0.05 and 0.1 while the v' coordinate thereof is greater than 0.55, the red light is corresponding to the CIE 1976 u'v' chromaticity diagram and the u' coordinate of the red point is between 0.5 and 0.55 while the v' coordinate thereof is greater than 0.5, and the blue light is corresponding to the CIE 1976 u'v' chromaticity diagram and the u' coordinate of the blue point is between 0.15 and 0.2 while the v' coordinate thereof is between 0.1 and 0.2. Thereby, the light emitted by the display panel 11 can match with the hue of the colors of the sRGB standard substantially and is extended towards the high-gamut region, so that the display panel 11 is provided with a higher color gamut and better display quality so as to enhance the product competitiveness.

Since the color energy spectrum can be adjusted by designing the transmission spectrum of the filter portion $CF(\lambda)$, the energy can be varied by changing the material type of the filter portion (e.g. R254, R177, G7, G36, G58, Y150, Y138, Y139, B15:6) and its weight percentage. For example, the peak wavelength of the transmission spectrum of the blue filter portion is specified as between 440 nm and 460 nm, the peak wavelength of the transmission spectrum of the green filter portion is specified as between 500 nm and 550 nm, and the ratio of the green energy to the blue energy corresponding to the display panel 11 under the operation of the highest gray level is specified as between 1.0 and 1.5, and the ratio of the red energy to the blue energy is between 2.0 and 2.6, so that the u' coordinate of the green point is between 0.05 and 0.1 while the v' coordinate thereof is greater than 0.55, the u' coordinate of the red point is between 0.5 and 0.55 while the v' coordinate thereof is greater than 0.5, and the u' coordinate of the blue point is between 0.15 and 0.2 while the v' coordinate thereof is between 0.1 and 0.2. Thereby, the light emitted by the display panel 11 can match with the hue of the three colors of the sRGB standard substantially and is extended towards the high-gamut region, so that the display panel 11 is provided with a higher color gamut and better display quality so as to enhance the product competitiveness. Moreover, the energy of the backlight module can be adjusted to fit the above-mentioned range by changing the material type and composition of the phosphor powder so that the display panel 11 can be provided with a higher color gamut and better display quality to enhance the product competitiveness.

Moreover, the energy ratio can be adjusted by designing $BLU(k)$ of the backlight module. For example, when blue LEDs cooperate with red and green phosphor powders to bring about a spectrum in the backlight module, by changing the material type or weight percentage of the phosphor powders or the current inputted to the backlight module, the peak wavelength of the blue light is approximately designed as between 440 nm and 460 nm, the peak wavelength of the transmission spectrum of the green phosphor powder is designed as between 500 nm and 550 nm, and the peak wavelength of the transmission spectrum of the red phosphor powder is designed as between 600 nm and 660 nm. As another example, when blue LEDs cooperate with yellow phosphor powder in the backlight module, by changing the material type or weight percentage of the phosphor powder or the current inputted to the backlight module, the peak wavelength of the blue light is approximately designed as between 440 nm and 460 nm, and the peak wavelength of the transmission spectrum of the yellow phosphor powder is designed as between 550 nm and 580 nm. Accordingly, the ratios of green energy to the blue energy and the red energy to the blue energy under the operation of the highest gray level can be adjusted. Additionally, the energy ratio also can be adjusted by designing the $CELL(\lambda)$ of the liquid crystal transmission spectrum. The above-mentioned methods for adjusting the energy ratio can be applied individually or together. The energy of the backlight module can be adjusted to fit the above-mentioned range by changing the material type and composition of the phosphor powder so that the display panel 11 can be provided with a higher color gamut and better display quality to enhance the product competitiveness. The phosphor powder includes sulfide-contained phosphor powder, nitride-contained phosphor powder or silicate-contained phosphor powder, for example.

The display panel 11 can have variations by being made with other technologies. For example, the color filter (CF) layer can be disposed on a side of the TFT array (color filter on array, COA), or the TFT array can be disposed on the CF substrate (TFT on CF, also called TOC or array on CF). However, the invention is not limited thereto.

Summarily, in the display apparatus of the invention, the display panel emits a green light under the operation of the highest gray level (e.g. 255$^{th}$ gray level for an 8-bit color level) of a green image and the green light has a green energy and a green point of the CIE 1931 xy chromaticity, and the display panel emits a blue light under the operation of the highest gray level of a blue image and the blue light has a blue energy and a blue point of the CIE 1931 xy chromaticity. The ratio of the green energy to the blue energy is between 0.7 and 1.5. The coordinates of the green point in the CIE 1931 chromaticity xy diagram are bounded by the equation: $y=-48.85x^2+21.987x-1.7766$ and the equation: $y=-48.85x^2+27.849x-3.2717$, while y is between 0.68 and 0.72. Thereby, the above-mentioned ranges of the color points approach the hue design of the sRGB standard, substantially coincide with the hue tones of the color points of the sRGB standard and extend towards the high-gamut direction, so that the display apparatus is provided with a higher color gamut and better display quality so as to enhance the product competitiveness.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display apparatus, comprising:
   a display panel emitting a green light having a green energy and a green point of the CIE 1931 xy chromaticity under the operation of the highest gray level of a green image, and emitting a blue light having a blue energy and a blue point of the CIE 1931 xy chromaticity under the operation of the highest gray level of a blue image,
   wherein the ratio of the green energy to the blue energy is between 0.7 and 1.5.

2. The display apparatus as recited in claim 1, wherein the ratio of the green energy to the blue energy is further between 0.75 and 1.1.

3. The display apparatus as recited in claim 1, wherein the display panel emits a red light having a red energy and a red point of the CIE 1931 xy chromaticity under the operation of the highest gray level of a red image and the coordinates of the red point in the CIE 1931 xy chromaticity diagram are bounded by the equation: $y=-2.021x^2+2.1871x-0.2218$ and the equation: $y=-2.021x^2+2.1871x-0.2618$, while x is between 0.66 and 0.70.

4. The display apparatus as recited in claim 3, wherein the ratio of the red energy to the blue energy is further between 1.2 and 1.7.

5. The display apparatus as recited in claim 4, wherein the ratio of the red energy to the blue energy is further between 1.25 and 1.6.

6. The display apparatus as recited in claim 4, wherein the coordinates of the red point in the CIE 1931 xy chromaticity diagram are further bounded by the equation: $y=-2.021x^2+2.1871x-0.2318$ and the equation: $y=-2.021x^2+2.1871x-0.2518$, while x is further between 0.67 and 0.69.

7. The display apparatus as recited in claim 3, wherein the red point is corresponding to the CIE 1976 u'v' chromaticity coordinates and the u' coordinate of the red point is between 0.5 and 0.55 while the v' coordinate thereof is greater than 0.5.

8. The display apparatus as recited in claim 3, wherein the ratio of the red energy to the blue energy is between 1.2 and 2.6.

9. The display apparatus as recited in claim 8, wherein the ratio of the red energy to the blue energy is further between 2.0 and 2.6.

10. The display apparatus as recited in claim 9, wherein the ratio of the red energy to the blue energy is further between 2.1 and 2.5.

11. The display apparatus as recited in claim 1, wherein the ratio of the green energy to the blue energy is further between 1.0 and 1.5.

12. The display apparatus as recited in claim 11, wherein the ratio of the green energy to the blue energy is further between 1.1 and 1.4.

13. The display apparatus as recited in claim 1, wherein the green point is corresponding to the CIE 1976 u'v' chromaticity coordinates and the u' coordinate of the green point is between 0.05 and 0.1 while the v' coordinate thereof is greater than 0.55.

14. The display apparatus as recited in claim 1, wherein the blue point is corresponding to the CIE 1976 u'v' chromaticity coordinates and the u' coordinate of the blue point is between 0.15 and 0.2 while the v' coordinate thereof is between 0.1 and 0.2.

* * * * *